United States Patent [19]

Gerszberg

[11] Patent Number: 5,463,675
[45] Date of Patent: Oct. 31, 1995

[54] EXTENDED HOME INDENTIFICATION BEING USED BY THE SAME SERVICE PROVIDER AS A HOME IDENTIFICATION IN A SERVICE AREA OTHER THAN THE HOME SERVICE AREA FOR CELLULAR RADIO TELEPHONE SYSTEMS

[75] Inventor: Irwin Gerszberg, Lakewood, N.J.

[73] Assignee: AT&T IPM Corp., Coral Gables, Fla.

[21] Appl. No.: 195,980

[22] Filed: Feb. 10, 1994

Related U.S. Application Data

[63] Continuation-in-part of Ser. No. 957,644, Oct. 6, 1992, abandoned, which is a continuation-in-part of Ser. No. 716,453, Jun. 17, 1991, abandoned.

[51] Int. Cl.$^6$ ........................................................ H04Q 7/22
[52] U.S. Cl. ................................ 379/60; 379/58; 379/59; 455/33.1; 455/34.1; 455/54.1
[58] Field of Search ................................. 379/56, 58, 59, 379/60, 63, 131, 140; 455/31.1, 33.1, 34.1, 15, 54.1

[56] References Cited

U.S. PATENT DOCUMENTS

| | | | |
|---|---|---|---|
| 4,677,653 | 6/1987 | Weiner et al. | 379/58 |
| 4,872,205 | 10/1989 | Smith | 455/58 |
| 4,901,340 | 2/1990 | Parker et al. | 379/60 |
| 4,905,301 | 2/1990 | Krolopp et al. | 455/34 |
| 4,972,455 | 11/1990 | Phillips et al. | 379/59 |
| 5,003,629 | 3/1991 | Ness-Cohr et al. | 455/54.1 |
| 5,008,925 | 4/1991 | Pireh | 379/60 |
| 5,020,091 | 5/1991 | Kroloppe et al. | 379/58 |
| 5,020,092 | 5/1991 | Phillips et al. | 379/59 |
| 5,020,093 | 5/1991 | Pireh | 379/59 |
| 5,101,500 | 3/1992 | Marvi | 455/33.1 |
| 5,187,806 | 2/1993 | Johnson et al. | 455/15 |

OTHER PUBLICATIONS

Lee, "Mobile Cellular Telecommunications Systems", 1989 pp. 42–46.
Motorola, "Dyna Tac 6000X Universal Mobile Telephone", 1984.
Nokia–Mobiar, "LX11T" May 1990.
Nokia–Mobiar, "PT612" Mar. 26, 1991.

*Primary Examiner*—Curtis Kuntz
*Assistant Examiner*—William Cumming
*Attorney, Agent, or Firm*—Alfred G. Steinmetz

[57] ABSTRACT

Transitions of a mobile radiotelephone between operating on A band service and B band service are controlled to enable the mobile radiotelephone to utilize the bands of a single service provider over a wide area of cellular service areas in which service is provided on either A or B bands by that single service provider. Each mobile radiotelephone served by a single service provider has an extended home system identification entered into its number assignment module (NAM). When the mobile radiotelephone is operating in a roam mode it scans both the A and B bands searching for the extended home system identification. If the system is successful in locking onto one of the extended home system identification channels the mobile radiotelephone uses that setup channel to establish and receive calls from its original service provider within the present service area. If the lockup can not be made the mobile radiotelephone uses the system I.D. and the A or B band as normally set in the NAM.

2 Claims, 3 Drawing Sheets

EXTENDED HOME INDENTIFICATION BEING USED BY THE SAME SERVICE PROVIDER AS A HOME IDENTIFICATION IN A SERVICE AREA OTHER THAN THE HOME SERVICE AREA FOR CELLULAR RADIO TELEPHONE SYSTEMS

This application is a continuation-in-part of application Ser. No. 07/957,644, filed on Oct. 6, 1992 now abandoned which is a continuation-in-part of Ser. No. 07/716,453 filed Jun. 17, 1991 which is now abandoned.

FIELD OF THE INVENTION

This invention relates to cellular radiotelephone systems, and in particular, to the provision of service to roaming subscribers by a single service provider operating at differing wireline and non-wireline frequency bands in nearby or adjacent cellular serving areas comprising a single cellular service system.

BACKGROUND OF THE INVENTION

Cellular radiotelephone systems are divided into cells to permit the systematic reuse of radio channels. A plurality of cells are often joined into a singular cellular system in which the entire geographical extent is defined as a single service area with separate service provided by two service providers. These two cellular providers are mandated by law and involve two bands of frequency for radiotelephone channels; one, the wireline band (A band), is assigned to a first service provider and the other, the non-wireline band (B band), is assigned to a second service provider.

When mobile radiotelephones are handed off in passage from one service area to another, during continuance of a call, (and become roamers) the same band (A or B) of frequency is normally retained for the balance of the call. When a roaming mobile telephone, initiates a new call within a new service area, it is programmed or otherwise operative to seek out or prefer the same A or B band it uses in its home territory. Some mobile radiotelephone units may permit manual selection of A or B bands by the user, but in general the mobile radiotelephone units are preset to at least prefer just one band regardless of its service area location.

Many service providers have acquired cellular systems in many differing cellular service areas. These areas are often nearby or adjacent to one another and the service provider has the opportunity to combine the various cellular systems into a large virtual single cellular service area. However the service provider may own A band channels in some service areas and B band channels in the balance of the service areas. Hence a typical customer, using one band in his home service area, may pass into an adjacent service area where his provider provides the other band and due to the mobile radiotelephone's propensity for remaining with a singular band becomes a customer of a competing service provider. This partially negates the advantage of acquiring a plurality of service areas to gain economies of scale in providing mobile radiotelephone service. Various systems have been proposed to accommodate the traveling cellular subscriber's mobile radio telephone. A system proposed in U.S. Pat. No. 4,972,455 provides a multi-bandwidth cellular telephone to allow use in differing cellular telephone systems such as a cellular telephone system and a mobile telephone system. Use in differing systems requires the use of different telephone numbers. Another arrangement disclosed in U.S. Pat. No. 5,020,091 contemplates the assignment of multiple telephone numbers to the radio telephone for use in different cellular radiotelephone systems. Another arrangement disclosed in U.S. Pat. 4,677,653 has a mobile phone unit that includes a plurality of telephone numbers. The assignment of added numbers to a mobile radiotelephone unit add to the cost of operation of that phone unit.

SUMMARY OF THE INVENTION

Transitions of a mobile radiotelephone between operating on A band service and B band service are controlled to enable the mobile radiotelephone to utilize the bands of a single service provider over a wide area of cellular service areas in which service is provided on either A or B bands by that single service provider. Utilizing the bands of the single service subscriber permits the radiotelephone to operate in a home mode of operation over the wide area of cellular service serviced by a single provider.

Each mobile radiotelephone served by a single service provider has an extended home system identification entered into its number assignment module (NAM). When the mobile radiotelephone is operating in a roam mode it scans overhead and/or control channels of both the A and B bands searching for the extended home system identification. If the system is successful in locking onto one of the extended home system identification setup channels the mobile radiotelephone uses that setup channel to establish and receive calls from its original service provider within the present service area. The mobile radiotelephone now operates as if it is in its home mode. It uses its originally assigned home telephone number. If the lockup can not be made the mobile radiotelephone uses the system I.D. and the A or B band as normally set in the NAM.

DETAILED DESCRIPTION

Figure 1:
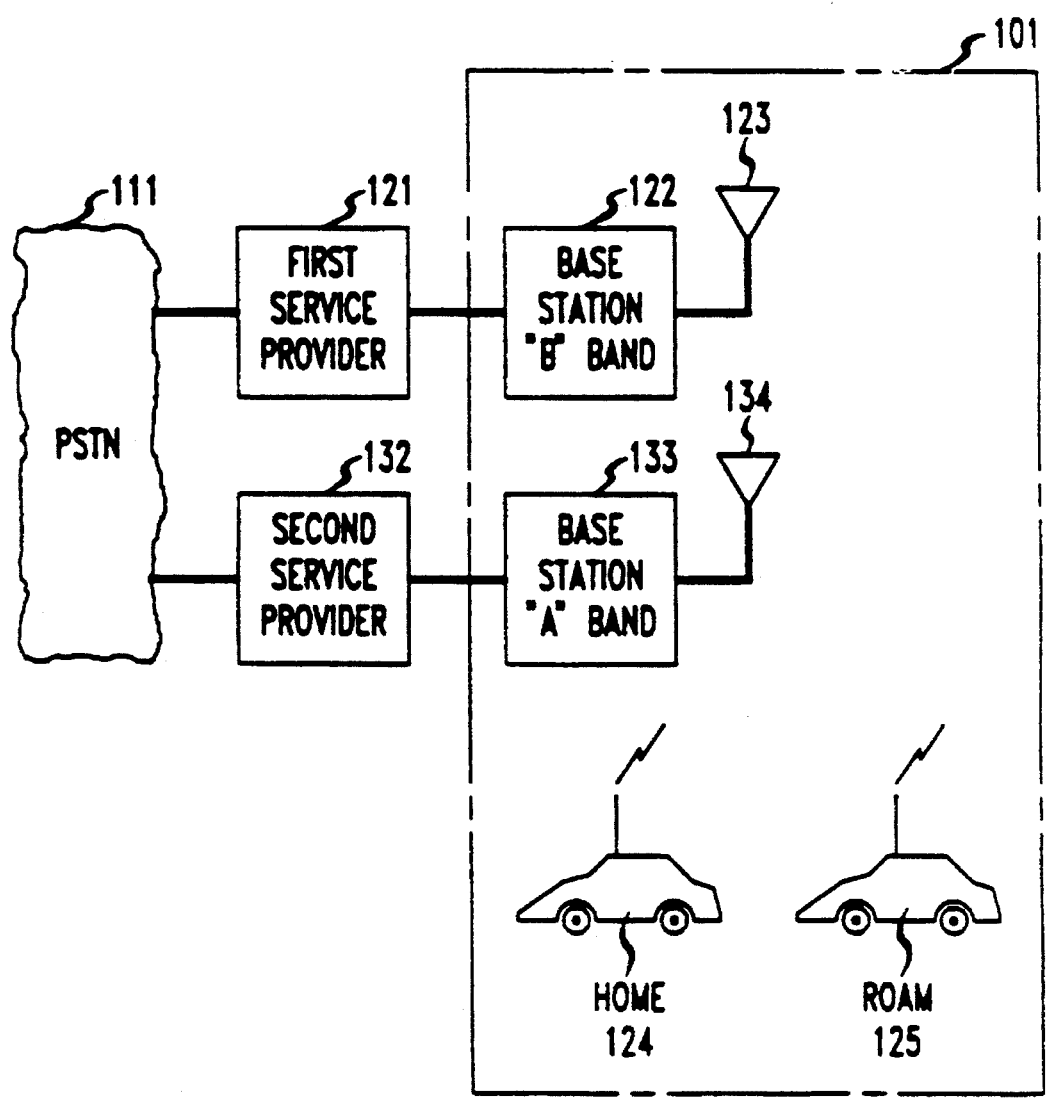
FIG. 1 is a block schematic of a plurality of cellular service areas each having service provided by a single service provider.
Figure 1:
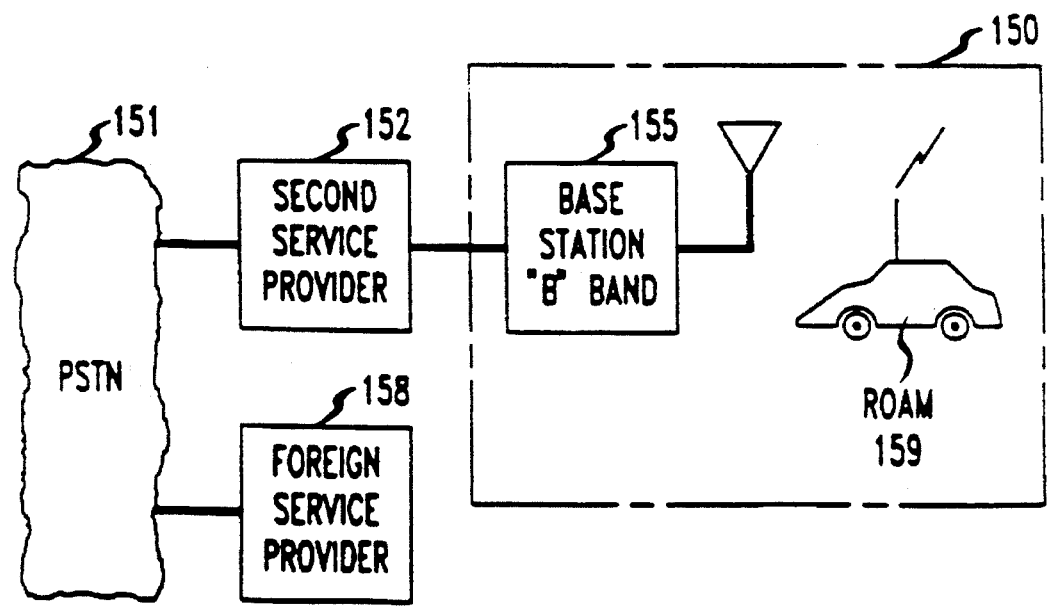

A typical illustrative cellular radiotelephone system, of a single service provider, covering a primary cell and at least a cell in at least another proximate cellular radiotelephone system is shown in the FIG. 1. A first cell or system 101 is connected to a public switched land telephone network 111. A first service provider operates from a switching center or site 121 at which the telephone signals are connected to at least one of a plurality of base stations 122 which services a single cell. The base station 122 transmits signals, via the antenna 123, to mobile radiotelephone units which include homer mobile radiotelephone units 124 and roamer mobile radiotelephone units 125. The first service provider utilizes the "B" band of frequencies and the customers of the first service provider have their mobile radiotelephone units programmed to seek the "B" band of frequencies when seeking radiotelephone service.

A second service provider, who has the switching station 132, is connected to the telephone network 111 and to a base station 133 and associated antenna 134. The second service provider operates within a cell or cells of the same geographical area served by the first service provider. The second service provider utilizes the "A" band of frequencies to service both home and roamer mobiles within the immediate service area.

The second service provider also provides mobile radiotelephone service in a proximate serving area 150 with a mobile switching office 152 connected to the land telephone network 151. In this serving area 150 the second service provider has been assigned the "B" band of frequencies and hence the base station 155 operates with the "B" band to service the mobile radiotelephone units. A roamer mobile radiotelephone unit 159, within the service area 150, may be one normally serviced by the service provider in the area 101 in which it is assigned the "A" band of frequencies.

If the roamer mobile radiotelephone unit 159 is adapted to respond to extended home IDs, it automatically connects to the second service provider when it seeks to initiate a call. Without this feature the roamer 159 automatically connects to the "A" band service provider 158 which in this case is the system of a competitor of the second service provider.

Figure 2:
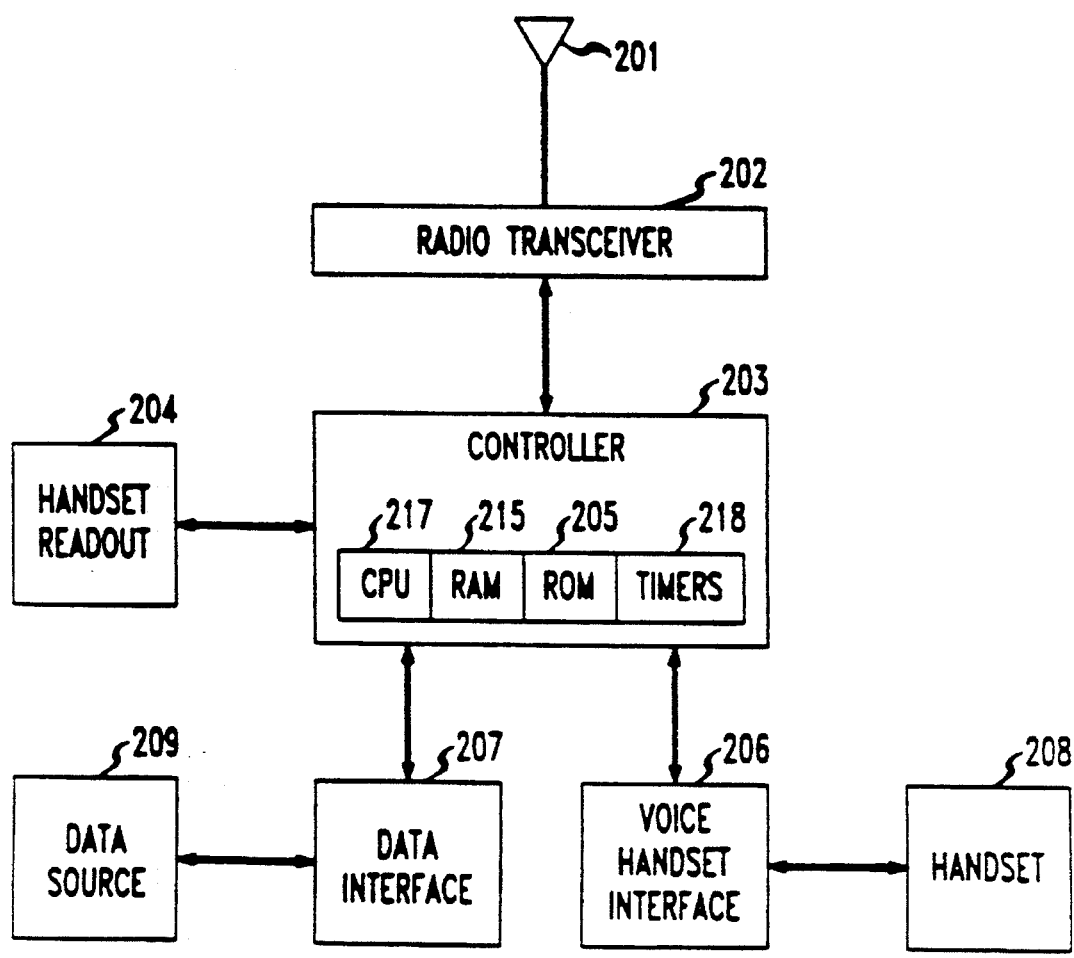
FIG. 2 is a block schematic of a mobile radiotelephone used in a system embodying the invention.

A mobile radiotelephone unit having features in accord with the invention is shown in the FIG. 2. An antenna 201 operative for receiving and transmitting radio signals is connected to a radio transceiver 202 (receiver/transmitter) which includes RF and IF signal processing circuits for receiving and transmitting message and control radio signals. The transceiver 202 is controlled by a controller 203 which includes a ROM memory 205, a RAM memory 215, timing circuits 218, and a CPU 217. The ROM memory 20 includes stored program controls controlling the operation of the mobile radiotelephone unit. The RAM memory includes NAM data storage such as the telephone number assigned to the mobile radiotelephone unit. It also includes NAM information such as the system identification, paging channels, A/B system selection etc. In accord with the invention, extended home system identifications are also included. The controller's ROM memory 205 also includes a stored program control to control the operation of the mobile unit. Controller 203 is also connected to a readout apparatus 204 which allows access to read and an ability to alter stored parameters of the mobile radiotelephone unit such as the NAM parameters.

The controller 203 connects message and information signals between the radio transceiver 202 and the data interface 207 and the voice handset interface 206. The voice interface 206 is connected to a handset unit used by the subscriber to receive and transmit voice message signals. The data source 209 may comprise a portable data processing device or a facsimile terminal or other data handling device.

A conventional mobile radiotelephone unit includes a stored program control which allows the seller or the user to choose either the wireline—"B" band or the non-wireline—"A" band in which the mobile radiotelephone will operate. Most conventional mobile radiotelephones have a selectable registration scheme with five options of operation as defined below. These options defined in control software are:

1. Preferred "B" then "A"
2. Preferred "A" then "B"
   NO ROAMING (HOME SYSTEM ONLY)
4. B ONLY
5. A ONLY Selection of one of these five registration options is normally made by the vendor of the mobile radiotelephone unit or the service provider. Some mobile units may have provision for the subscriber to manually access and select the desired option. In one exemplary commercially available unit, the mobile unit has a dial keystroke responsive menu display on the readout device 204 which allows selection of the desired option. As is readily apparent, the selectable options available require the active input of the subscriber when he enters a new service area. With the available options the mobile unit operates on an "A" band or a "B" band but not both bands unless the user actively decides otherwise. As indicated herein above, this arrangement may result in lost revenue for a cellular provider having differing bands in proximate cellular telephone service areas.

Permitting a single service provider to retain customers over a wide areas of service in which the bands differ from service area to service area is achieved by providing an extended home service registration in the mobile radiotelephone unit. The mobile radiotelephone unit of FIG. 2, according to the principles of the invention, is provided with an extended home system registration. This is enabled by providing or making available non-volatile memory in the RAM memory to store a selectable system preference known as the extended home system ID.

In accordance with the invention, the programmed instructions of the mobile radiotelephone determine which system has been preset or preprogrammed as the preferred carder at the initiation of a call. A preferred carrier determination is made by scanning a bank of stored channels for a setup channel at the initiation of a call by the subscriber of a preferred carrier system. The signal strength of these preferred channels are measured.

The mobile radiotelephone terminal's stored instructions have it determine the two strongest channels available for setup. The terminal now attempts to acquire word synchronization on the strongest setup channel. If this synchronization attempt succeeds, the programmed instructions of the terminal updates its overhead information by acquiring such items as the system parameters and the system identification (SID). When this operation is complete a paging channel is selected by the mobile.

If synchronization is not attainable on the strongest channel, word snchronization is attempted on the second strongest channel. Failing that, the terminal switches to an alternate carrier (if allowed by the selectable system preference).

After the terminal has established synchronization with a setup channel it must determine if it is in a home or a roam mode. The terminal is in a roamer mode when it is in an authorized operating area where the received system identification (SID) differs from the terminals stored home SID. If the terminal is in the roamer mode and the service provider has activated the extended home system ID the terminal in accord with the invention takes measures to use service provided by the original provider. The roaming radiotelephone terminal immediately begins to search for an extended home ID which it compares with a plurality of stored extended IDs. The terminal scans all "A" and "B" band setup channels and attempts to gain synchronization and then search for an ID match with the stored extended IDs. Upon finding a match, the terminal indicates that it is in the roam mode and operates on the preferred channel of the single service provider. If no match is found the terminal retreats to a fallback mode and attempts to gain channel synchronization in the standard manner as dictated by selectable system preference in the terminals memory.

In accord with the invention, the extended home identification is entered into the terminal's memory as a special set of NAM parameters. When in a roam mode the terminal scans both the "A" and "B" bands searching for the extended home identifications. The stored instructions enabling the roamer to access its home service provider are shown by the flow chart of FIG. 3.

Figure 3:
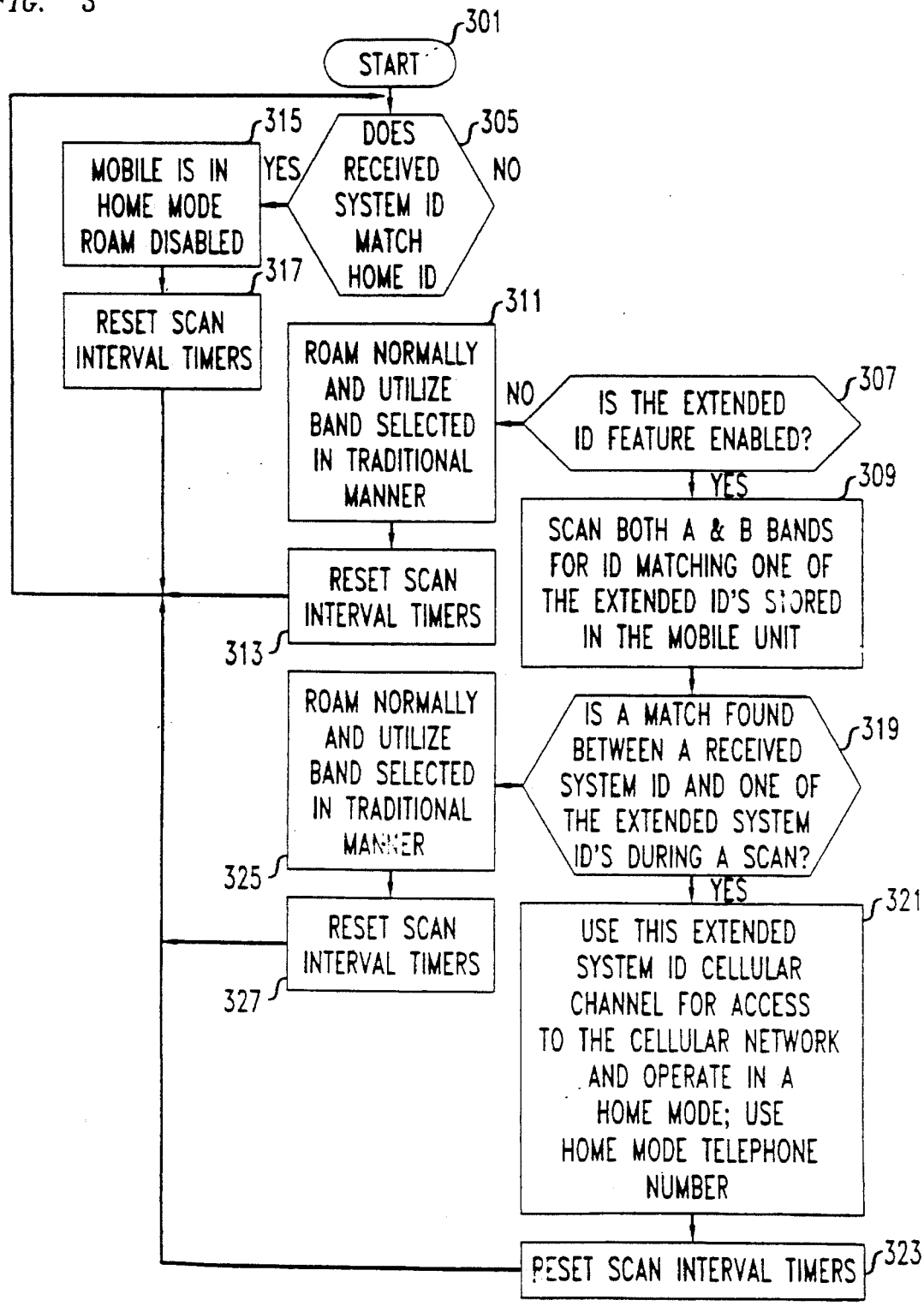
FIG. 3 discloses a flow chart of a method of operating the mobile radiotelephone of FIG. 2 in accord with the principles of the invention.

The flow process in FIG. 3 begins at the start terminal 301 activated when the radiotelephone is operative to initiate a call. An initial decision is made by comparing the received system ID with the stored home ID, as specified by decision block 305. If the received system ID matches the home ID the flow process proceeds to the block 315 whose instructions determine that the mobile radiotelephone is in the home mode of operation. The roamer mode is disabled. The scan interval timers of the mobile radiotelephone are reset per the instructions of block 317 and the flow process returns to the input of the decision block 305 in readiness for the next ID comparison.

If the result of the decision of decision block 305 shows that the received ID does not match the home ID, the mobile radiotelephone is in a roaming state. The instructions indicated by decision block 307 determine if the mobile radiotelephone has the extended ID feature enabled which permits it to automatically remain with its home service provider.

If the radiotelephone does not have this extended ID feature, the flow process proceeds to the block 311 which enables the radiotelephone to roam normally and access its service band in the normal manner. The flow proceeds to block 313 having instructions to reset all the scan interval timers and the flow then returns to the input of the decision block 305.

If the result of the decision of instructions of block 307 indicate that the radiotelephone has the extended ID feature, the flow proceeds to the block 309. The instructions of the block 309 have the radiotelephone scan both the "A" and "B" bands to find an ID matching one of the extended IDs stored in the memory of the mobile radiotelephone. The instructions of the decision block 319 determine if during the scan a match is found between the received system ID and the stored extended IDs.

If no match is found between the received ID and the stored extended system IDs, the flow process proceeds to the block 325 which instructs the mobile radiotelephone to roam normally and select the operative band in the traditional manner. The instructions of block reset the scan interval timers and the flow process returns to the input of the decision block 305.

If a match is found between the received system ID and one of the extended system IDs as determined by decision block 319 the flow process proceeds to the block 321. The instructions of block 321 use the extended system ID to access the cellular network using the same service provider used in the home service area. Having a match between extended and received system ID allows the radio telephone to operate in a home mode of operation utilizing its original home telephone number. The flow process then proceeds to the block 323 whose instructions reset the scan interval timers. The flow returns to the input of decision block 305.

I claim:

1. In a cellular mobile radio telephone communications system having A band and B band frequencies in each service area and in which a service provider is assigned one of the A band and B band of frequencies in a home service area and another different one of the A band and B band of frequencies in a service area other than the home service area, a method for predisposing a mobile radiotelephone to select service from the same service provider in the home service area and the service area other than the home service area, comprising the steps of:

storing in the number assignment of the mobile radiotelephone a home identification number and at least one extended home identification number, the extended home identification being used by the same service provider as a home identification in the service area other than the home service area;

operating the mobile radiotelephone to set up a call;

determining if the operating mobile radiotelephone is located in a service area other than the home service area by determining if the home identification number is operative;

searching overhead/control channels of both the A and B band of frequencies if the home identification number is not operative for use as the extended home identification number, the mobile radio telephone locking onto a channel provided by the same service provider containing the extended home identification number;

the mobile radiotelephone in response to locking operating in a home mode using its home mode telephone number and establishing a call in the service area other than the home area with the service provider used in the home service area.

2. In a cellular mobile radio telephone communications system having A and B band frequencies in each service area and in which a service provider is assigned one of the A band and B band of frequencies in a home service area and another one of the A band and B band of frequencies in a service area other than the home service area, mobile radiotelephone apparatus predisposed to select service from the same service provider in the home service area and the service area other than the home service area, comprising:

the mobile radiotelephone apparatus including radio equipment and apparatus for operating the mobile radiotelephone apparatus;

and including memory having a number assignment module for storing identification numbers of the service provider used in the home service area and at least an extended home identification code used by the service provider as a home identification code in a service area other than the home service area;

a controller for controlling a frequency of operation of the mobile radiotelephone apparatus, including:

a central processing unit connected for comparing identification codes received via the radio equipment on control channels with the stored home identification code and the extended home identification code and when in a service area other than the home service area responding to the extended home identification code to select service from the service provider serving the home service area and operating in a home mode of operation using its home mode telephone number and selecting a frequency band for operation of the radio equipment based on receipt of the extended home identification code on a control channel of the service area other than the home service area.

\* \* \* \* \*